United States Patent Office 3,113,941
Patented Dec. 10, 1963

3,113,941
ESTERS OF HYDROXYARYLTRIAZINES
Iral B. Johns, Marblehead, and Harry R. Di Pietro, Watertown, Mass., assignors to Monsanto Research Corporation, St. Louis, Mo., a corporation of Delaware
No Drawing. Filed July 13, 1961, Ser. No. 123,641
9 Claims. (Cl. 260—248)

This invention relates to nitrogenous esters and more particularly relates to esters of hydroxyaryl-substituted triazines and methods of preparing the same.

According to the invention, there are provided new and valuable esters by the reaction of a 2,4,6-tris(2-hydroxyaryl)-s-triazine with a hydrocarbon carboxylic acid or an acyl halide or an anhydride thereof, the reaction of e.g., an acyl halide, proceeding as follows for the formation of the triester:

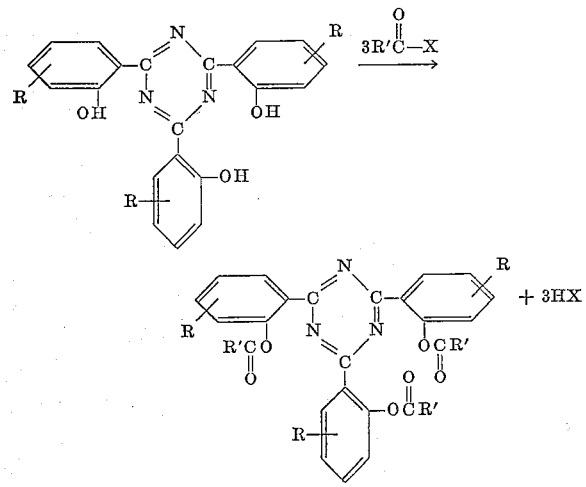

wherein R is selected from the class consisting of hydrogen and alkyl radicals of from 1 to 5 carbon atoms, R' is selected from the class consisting of alkyl radicals of from 1 to 5 carbon atoms, the phenyl radical, and alkylphenyl radicals having from 1 to 5 carbon atoms in the alkyl radical, and X is selected from the class consisting of chlorine or bromine.

Depending upon the availability of carboxylic acid compound which is employed, from 1 to 3 of the hydroxy radicals of the 2,4,6-tris(2-hydroxyaryl)-s-triazine are esterified. There are thus formed the tris(2-acyloxyaryl)-s-triazines, or the bis(2-acyloxyaryl)-2-hydroxyaryl-s-triazines, or the 2-acyloxyaryl-bis(2-hydroxyaryl)-s-triazines. Compounds of the following general formula are thus provided by the invention:

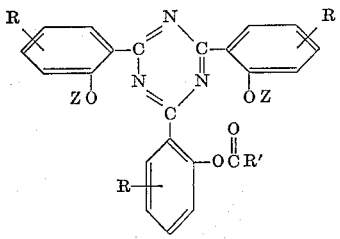

in which R and R' are as above defined, and Z is selected from the class consisting of hydrogen and the radical —C(O)R'.

The tris(2-hydroxyaryl)-s-triazines which are employed as starting materials are readily obtainable by the trimerization of the nitrile or amide of an o-hydroxy-substituted aromatic mono-carboxylic acid. For example, as described by Cousin and Volmar, Bull. Soc. Chim. (4), 15, 416 (1914), upon heating salicylamide at 260–270° C., 2,4,6 - tris(2 - hydroxyphenyl) - s - triazine is obtained. The alkyl-substituted salicylamides are similarly converted to the 2,4,6-tris(alkyl-2-hydroxyphenyl)-s-triazines, e.g., trimerization of 2,3-, 2,4-, 2,5- or 2,6-cresotamide yields 2,4,6-tris(3- or 4- or 5- or 6-methyl-2-hydroxyphenyl)-s-triazine and similarly the trimerization of 3-, 4-, 5- or 6-ethylsalicylamide yields 2,4,6-tris(3-, 4-, 5- or 6-ethyl-2-hydroxyphenyl)-s-triazine.

The carboxylic acid compound which is employed for the esterification of the 2,4,6-tris(2-hydroxyaryl)-s-triazine may be a carboxylic acid, acyl halide or anhydride. This includes the alkanecarboxylic acid compounds, e.g., acetic acid, acetyl bromide, acetyl chloride, acetic anhydride, propionyl chloride, butyric anhydride or valeroyl bromide, etc. Also included are the aromatic carboxylic acid compounds, e.g., benzoyl chloride or bromide, benzoic acid, benzoic acid anhydride, o-, m- or p-toluoyl chloride or bromide, o-, m- or p-ethylbenzoic acid anhydride, o-, m- or p-pentylbenzoyl chloride or bromide, etc.

Examples of the acyloxyphenyl-s-triazines provided by the invention are 2,4,6-tris(4-methyl-2-propionyloxyphenyl)-s-triazine which is obtained by reaction of 3 moles of propionic acid anhydride with 1 mole of 2,4,6-tris(2-hydroxy-4-methylphenyl)-s-triazine; 2,4-bis(2-tolyloxyphenyl)-6-(2-hydroxyphenyl)-s-triazine by reaction of 2 moles of 2-toluoyl bromide with 1 mole of 2,4,6-tris(2-hydroxyphenyl)-s-triazine; 2-(2-butyryloxyphenyl)-4,6-bis(2-hydroxyphenyl)-s-triazine by reaction of 1 mole of butyryl chloride with 1 mole of 2,4,6-tris(2-hydroxyphenyl)-s-triazine; 2,4,6-tris[2-(4-ethylbenzoyloxy)-3-n-butylphenyl]-s-triazine from 3 moles of 4-ethylbenzoic acid anhydride and 1 mole of 2,4,6-tris(3-n-butyl-2-hydroxyphenyl)-s-triazine; 2,4,6-tris(hexanoyloxy-3-isopropylphenyl)-s-triazine from 3 moles of hexanoyl bromide and 1 mole of 2,4,6-tris(3-isopropyl-2-hydroxyphenyl)-s-triazine; 2,4 - bis(2 - propionyloxyphenyl) - 6 - (2 - hydroxyphenyl)-s-triazine from 2 moles of propionic acid anhydride and 1 mole of 2,4,6-tris(2-hydroxyphenyl)-s-triazine; 2,4-bis(2 - hydroxy - 4 - ethylphenyl) - 6 - (2 - benzoyloxy-4-ethylphenyl)-s-triazine from 1 mole of benzoyl bromide and 1 mole of 2,4,6-tris(2-hydroxy-4-ethylphenyl)-s-triazine; 2,4 - bis(2 - hydroxy - 3 - ethylphenyl) - 6 - (2-butyryloxy-3-ethylphenyl)-s-triazine from 1 mole of butyric acid and 1 mole of 2,4,6-(2-hydroxy-3-ethylphenyl)-s-triazine; 2,4 - bis(2 - hydroxyphenyl) - 6 - (2 - p - ethylbenzoyloxyphenyl)-s-triazine from 1 mole of p-ethylbenzoyl bromide and 1 mole of 2,4,6-(2-hydroxyphenyl)-s-triazine, etc.

Reaction of the 2,4,6-(2-hydroxyaryl)-s-triazine with the carboxylic acid compound takes place readily by contacting the acidic compound with said triazine at ordinary or increased temperature and in the presence of an inert diluent or solvent. Advantageously, when the carboxylic acid, rather than the acyl halide or anhydride, is used, reaction is effected at a temperature of, say, 50° C. to the refluxing temperature of the reaction mixture. Using the acyl halide or the anhydride, optimum conditions generally include operation at temperatures which may be as low as, say, −10° C., i.e., extraneous heating will be generally unnecessary unless the acidic component is a comparatively high molecular weight compound, e.g., octanoyl or lauroyl chloride or bromide, an alkly-substituted benzoyl chloride having either a long-chain alkyl radical as substituent or a number of alkyl substituents, etc.

Since formation of the esters proceeds by reaction of one mole of the acid compound with one of the hydroxy radicals of the tris(hydroxyaryl)-s-triazine, the two reactants are advantageously employed in such stoichiometric proportions, although in many instances, particularly when less than 3 moles of the carboxylic acid compound is used per mole of the triazine compound, there are formed products of varying degree of esterification. Generally, in order to obtain the triesters, there should be employed, of course, three moles of the acid compound per mole of the triazine. However, even in such 3:1 molar ratio, there will be present in the reaction mixture minor amounts of mono- and diesterification products if the reaction is interrupted before all of the available acid component has had opportunity to participate in the reaction. Completion of the tri-esterification can be ascertained by noting the cessation of change in the refractive index and/or in the temperature of the reaction mixture or by sampling the reaction mixture for content of free acid. When the intermediate esterification products, rather than the tri-esters, are the desired end products, use of less than the 3:1 molar ratio of acid compound to triazine compound is recommended. Since the second hydroxy radical appears to be as readily esterified than the first hydroxy radical, when preparing the incompletely esterified tris(hydroxyaryl)-s-triazine, the product is usually a mixture of the mono-ester and the di-ester. Hence, even though only one mole of the carboxylic acid compound is employed per mole of the tris(2-hydroxyaryl)-s-triazine, there will generally be obtained a mixture of both the bis(2-acyloxyphenyl)-2-hydroxyphenyl-s-triazine and the 2-acyloxyphenyl-bis(2-hydroxyphenyl)-s-triazine. To obtain a preponderance of the mono-esterification product, it is advisable to mitigate reaction rate, e.g., by employing a large quantity of diluent, and/or by operating at low temperatures.

The three different types of esterification products, i.e., the mono-, di- and tri-esters are readily separated from each other when they are present together in the reaction mixture, using isolating procedures known to those skilled in the art, e.g., solvent extraction, fractional crystallization, etc. Generally, the melting points of the products and their solubility decrease with increasing degree of esterification.

The presence of an inert diluent or solvent is advantageous in obtaining smooth reaction and avoiding side-reactions, e.g., polymerization. Inert liquid diluents which are useful for the present purpose are polar solvents, generally, e.g., dioxane, morpholine, pyridine, dimethylformamide, dimethylsulfoxide, etc., as well as the non-polar liquids such as benzene, hexane, dichlorobenzene or carbon tetrachloride, which materials while not being solvents for the tris(hydroxyaryl)-s-triazines are useful in serving to facilitate uniform distribution of the reactions throughout the reaction mixture by suspension.

When using the carboxylic acid, rather than the acyl halide or anhydride, water is formed as by-product. Since the reaction is of the equilibrium type, it is preferred that the by-product water be removed continuously during the course of the reaction in order to maintain the equilibrium shift in the desired direction. The solvent or diluent employed in the reaction may be selected on the basis that it will form an azeotrope with water or that it boils above water, and thus the temperature of reaction can be maintained at a level which facilitates removal of the water without affecting the solvent or diluent. Considering the prerequisites of a solvent or diluent, generally any organic liquid which is non-reactive with either the reactants or the product materials may be used.

We have also found that when effecting the reaction with the free acid or the acid anhydride as acid component, it is advantageous to operate in the presence of an acidic or basic catalyst of esterification, e.g., mineral acids such as sulfuric, hydrochloric, nitric, chlorosulfuric or phosphoric acid, acidic salts such as ferric chloride or magnesium bisulfate, organic sulfonic acids such as benzenesulfonic acid or 4-toluenesulfonic acid, etc.

When the carboxylic acid component is an acyl halide, the reaction results in the evolution of hydrogen halide. This may be removed from the reaction zone, and the course of the esterification facilitated thereby, by working in the presence of a hydrogen halide scavenger, e.g., an organic or inorganic base, or by employing rapid stirring and/or dephlegmation for dissipation of the hydrogen halide.

The presently provided esters of the 2,4,6-tris(2-hydroxyphenyl)-s-triazines are stable, well-characterized compounds which are generally waxy to crystalline solids. They are advantageously employed for a variety of industrial purposes, e.g., as plasticizers, for synthetic resins and plastics, as antioxidants and curing aids in the manufacture of natural and synthetic rubber products, and as gasoline and hydrocarbon oil lubricant additives. As disclosed in our copending application Serial No. 123,637, filed of even date, the mono- and di-esters are valuable as starting materials for the synthesis of coordination compounds of bivalent tetracoordinating metals, such as beryllium, zinc, copper, cobalt, nickel, lead, etc., which coordination compounds are readily polymerized to give very high-melting, moldable and extrudable solids.

The invention is further illustrated by, but not limited to, the following examples.

*Example 1*

To a suspension of 5 g. of 2,4,6-tris(2-hydroxyphenyl)-s-triazine in 25 ml. of pyridine there was added 6 g. of acetic anhydride. Within about 15 minutes substantially one-half of the triazine had dissolved, and by the end of about 4 hours the reaction mixture had turned into a clear solution containing only a few particles of undissolved material. It was allowed to stand overnight at room temperature and then poured into a mixture of dilute hydrochloric acid and cracked ice. The copious, white precipitate which formed was extracted with chloroform, and the chloroform extracts thus obtained were washed successively with dilute hydrochloric acid, dilute aqueous potassium hydroxide, and finally with water. After drying over sodium sulfate and evaporation of the solvent, the crystalline product was recrystallized from benzene-ethanol to give the substantially pure 2,4,6-tris(2-acetoxyphenyl)-s-triazine, M.P. 147–148° C., and analyzing as follows:

|  | Found | Calcd. for $C_{27}H_{21}N_3O_6$ |
|---|---|---|
| Percent C | 67.32 | 67.07 |
| Percent H | 4.64 | 4.38 |
| Percent N | 8.76 | 8.69 |

*Example 2*

Acetic anhydride (2.7 cc.) was added to a mixture consisting of 10 g. of 2,4,6-tris(2-hydroxyphenyl)-s-triazine and 50 cc. of pyridine. The whole was stirred for 7 hours, and then allowed to stand overnight. The solids in the resulting mixture were filtered off and the filtrate was poured into cold, 3 N hydrochloric acid. The off-white solid thus precipitated was extracted with chloroform, and the extracts washed with 3 N hydrochloric acid and with water, and dried over sodium sulfate. The dried material was concentrated to remove the chloroform and the concentrate was then triturated with petroleum ether to give a precipitate of a crude solid. This was fractionally crystallized from acetonitrile to give a first crop of crystals (A), and a second crop of crystals (B). Recrystallization of (A), first from benzene and then from acetonitrile-benzene gave the substantially pure 2-(2-acetoxyphenyl)-4,6-bis(2-hydroxyphenyl)-s-triazine, M.P. 202° C. and analyzing as follows:

|  | Found | Calcd. for $C_{23}H_{17}O_4N_3$ |
|---|---|---|
| Percent C | 69.35 | 69.18 |
| Percent H | 4.30 | 4.29 |
| Percent N | 10.73 | 10.52 |

The second crop of crystals (B) was recrystallized first from benzene-petroleum ether and then from benzene-ethanol to give the substantially pure 2,4-bis(2-acetoxyphenyl)-6-(2-hydroxyphenyl)-s-triazine, M.P. 136–137° C., and analysing as follows:

|  | Found | Calcd. for $C_{25}H_{19}O_5N_3$ |
|---|---|---|
| Percent C | 68.02 | 68.04 |
| Percent H | 4.34 | 4.53 |
| Percent N | 9.52 | 9.71 |

The copper chelate of the mono-acetyl derivative, i.e., the 2-(2-acetoxyphenyl)-4,6-bis(2-hydroxyphenyl)-s-triazine was prepared as follows: Into a 250 ml. flask were placed 500 mg. of said mono-acetyl derivative and 100 ml. of dioxane. The reaction mixture was heated until solution was complete. It was then allowed to cool to room temperature, and a solution of 0.25 g. cupric acetate monohydrate in 30 ml. of methanol was added with stirring. A green precipitate appeared instantly. After filtration and washing with alcohol and drying there was obtained a virtually quantitative yield of the copper chelate, analyzing 13.32% Cu as against 13.79%, the calculated value for $C_{23}H_{15}N_3O_4Cu$. Since the ratio of copper to triazine ring is 1:1, the present chelate has copper coordinated at both of the free hydroxy sites. Molding of the copper chelate in a high pressure molding apparatus gives a hard, coherent molded piece of very good thermal stability.

The copper chelate of the diacetyl derivative, i.e., the 2,4 - bis(2-acetoxyphenyl)-6-(2-hydroxyphenyl)-s-triazine was prepared as follows: Into a 125 ml. flask were placed 1 g. of said diacetyl derivative and 40 ml. of absolute ethanol. After complete solution, 0.45 g. of cupric acetate monohydrate in 30 ml. of ethanol was added with stirring. The green precipitate was filtered, and the filtrate was concentrated to a small volume and yielded more solid. The combined solids were dried in vacuo at 60° C. to give the copper chelate, not melting at 360 °C. and analyzing 6.79% copper. The fact that the copper value is this low indicates that not more than one coordination site is used in formation of the chelate, the copper content of the product indicating one copper atom per more than two triazines (theoretical for the 1:2 Cu:triazine compound product, $C_{25}H_{18}N_3O_5Cu_{0.5}$, is 6.75%).

Example 3

2,4,6-tris(2-hydroxyphenyl)-s-triazine (10 g.) was dissolved in 120 g. of boiling pyridine. To the cooled solution was added 16 g. of benzoyl chloride. The mixture was stirred for 3 hours at room temperature to ensure complete reaction and then left standing overnight. This amber reaction mixture was slowly poured with vigorous stirring into dilute hydrochloric acid solution containing chipped ice. There was precipitated a tan gum which was extracted with 2 x 50 ml. portions of chloroform. The combined chloroform extracts were washed twice with dilute hydrochloric acid solution, twice with water and then dried over anhydrous sodium sulfate. The filtrate and chloroform washings were concentrated to a small volume. The syrupy residue was treated with warm methanol to give lumpy solids and crystals. The solid was filtered, air dried and ground to a fine powder to facilitate subsequent purification. Crystallization of the powdered material from dioxane-methanol gave the substantially pure 2,4,6-tris(2-benzoyloxyphenyl)-s-triazine, M.P. 147–148° C. and analyzing as follows:

|  | Found | Calcd. for $C_{42}H_{27}O_6N_3$ |
|---|---|---|
| Percent C | 75.2 | 75.32 |
| Percent H | 4.0 | 4.06 |
| Percent N | 6.6 | 6.28 |

What we claim is:
1. An ester of the formula

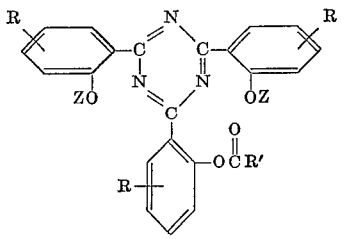

wherein R is selected from the class consisting of hydrogen and alkyl of from 1 to 5 carbon atoms, R' is selected from the class consisting of alkyl of from 1 to 5 carbon atoms, phenyl and alkylphenyl having from 1 to 5 carbon atoms in the alkyl, and Z is selected from the class consisting of hydrogen and —C(O)R'.

2. 2,4,6 - tris(2-alkanoyloxyphenyl)-s-triazine wherein alkanoyl has from 2 to 6 carbon atoms.

3. 2,4,6-tris(2-acyloxyphenyl)-s-triazine wherein acyl is alkylbenzoyl having from 1 to 5 carbon atoms in the alkyl.

4. 2,4 - bis(2-alkanoyloxyphenyl) - 6 - (2-hydroxyphenyl)-s-triazine wherein alkanoyl has from 2 to 6 carbon atoms.

5. 2,4 - bis(2 - hydroxyphenyl)-6-(2-alkanoyloxyphenyl)-s-triazine wherein alkanoyl has from 2 to 6 carbon atoms.

6. 2,4,6-tris(2-acetoxyphenyl)-s-triazine.

7. 2-(2-acetoxyphenyl) - 4,6 - bis(2-hydroxyphenyl)-s-triazine.

8. 2,4 - bis(2 - acetoxyphenyl)-6-(2 - hydroxyphenyl)-s-triazine.

9. 2,4,6-tris(2-benzoyloxyphenyl)-s-triazine.

References Cited in the file of this patent

Cousin et al.: "Bull. Soc. Chim." (4), vol. 15, pages 416–17 (1914).

Weygand: "Organic Preparations," Interscience Pub. Inc., New York, 1945, pages 171, 180 and 181.